(12) United States Patent
Fisher

(10) Patent No.: US 9,282,875 B2
(45) Date of Patent: *Mar. 15, 2016

(54) ALARM UNIT FOR DISHWASHING SYSTEMS

(71) Applicant: TCD Parts, Inc., Edgerton, MO (US)

(72) Inventor: Mark B. Fisher, Edgerton, MO (US)

(73) Assignee: TCD PARTS, INC., Edgerton, MO (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/789,307

(22) Filed: Jul. 1, 2015

(65) Prior Publication Data

US 2015/0297056 A1    Oct. 22, 2015

Related U.S. Application Data

(63) Continuation-in-part of application No. 13/969,348, filed on Aug. 16, 2013, now Pat. No. 9,095,248.

(60) Provisional application No. 61/683,876, filed on Aug. 16, 2012.

(51) Int. Cl.
| | |
|---|---|
| *G08B 21/00* | (2006.01) |
| *A47L 15/42* | (2006.01) |
| *G01F 23/00* | (2006.01) |
| *A47L 15/00* | (2006.01) |

(52) U.S. Cl.
CPC ......... *A47L 15/4297* (2013.01); *A47L 15/0036* (2013.01); *G01F 23/00* (2013.01); *A47L 2401/023* (2013.01); *A47L 2401/30* (2013.01); *A47L 2501/26* (2013.01); *Y10T 137/0324* (2015.04); *Y10T 137/7287* (2015.04)

(58) Field of Classification Search
CPC ............ A47L 15/4297; A47L 2501/26; A47L 2401/30; A47L 2401/023; A47L 15/036; G01F 23/00; Y10T 137/7287; Y10T 137/0324
USPC ........... 340/603, 612, 619, 686.1, 606, 691.1, 340/618; 134/56 D, 57 D, 18, 26, 113; 137/2, 386, 558
See application file for complete search history.

(56) References Cited

U.S. PATENT DOCUMENTS

| | | | |
|---|---|---|---|
| 5,621,392 A * | 4/1997 | Paolini et al. | ................. 340/603 |
| 6,819,250 B2 | 11/2004 | Nishioka | |
| 7,392,813 B2 | 7/2008 | Bertram et al. | |
| 7,652,267 B2 | 1/2010 | Tokhtuev et al. | |
| 7,789,967 B2 | 9/2010 | Classen et al. | |
| 7,989,780 B2 | 8/2011 | Tokhtuev et al. | |
| 9,095,248 B2 * | 8/2015 | Fisher | |
| 2005/0195087 A1 * | 9/2005 | Thompson et al. | ........... 340/603 |
| 2008/0134750 A1 | 6/2008 | Riley et al. | |
| 2012/0186614 A1 | 7/2012 | Hockaday et al. | |
| 2012/0298146 A1 | 11/2012 | Padtberg et al. | |

* cited by examiner

*Primary Examiner* — Anh V La
(74) *Attorney, Agent, or Firm* — Lathrop & Gage LLP

(57) ABSTRACT

A method for sequentially monitoring a level of a sanitation agent comprises the step of providing a supply tube having a first portion and a second portion. The method includes the step of linking the supply tube first portion and the supply tube second portion with a pipe. An optical sensor is situated adjacent the pipe, and is used to take a reference reading and a fault check reading. A controller imposes a warning signal when a difference between the reference reading and the fault check reading is greater than a threshold. The reference reading is taken when the sanitation agent is in direct contact with the pipe.

20 Claims, 9 Drawing Sheets

ALARM UNIT FOR DISHWASHING SYSTEMS

CROSS-REFERENCE TO RELATED APPLICATIONS

This application is a continuation-in-part of U.S. patent application Ser. No. 13/969,348 filed Aug. 16, 2013, which claims priority to U.S. Provisional Patent Application No. 61/683,876 filed Aug. 16, 2012. The disclosure of each is incorporated herein by reference in its entirety.

BACKGROUND OF THE INVENTION

The invention relates generally to the field of alarm units for dishwashers. More specifically, the invention relates to the field of alarm units that monitor the amount of sanitation agents in dishwashing systems.

SUMMARY

Systems and methods for monitoring sanitation agents in dishwashing systems are disclosed herein. According to an embodiment, an alarm system for monitoring a level of a sanitation agent in a dishwasher having a sanitation agent supply vessel associated with a supply tube comprises a hollow pipe. The supply tube has a first portion adjacent the supply vessel and a second portion. The supply tube first portion conveys the sanitation agent to the supply tube second portion via the hollow pipe. The alarm system includes an optical sensor configured for sequentially taking a reference reading, a first reading, and a second reading. The first and the second readings are averaged to compute a fault check reading. The alarm system includes a first output device, and a controller in electronic communication with the optical sensor and the first output device. The controller causes the first output device to output a warning signal upon detecting an air bubble in the pipe when a magnitude of the difference between the reference reading and the fault check reading exceeds a threshold.

According to another embodiment, a method for monitoring a level of a sanitation agent in a dishwashing system having a sanitation agent supply vessel includes the step of providing a supply tube having a first portion and a second portion. The supply tube first and second portions are unconnected to one another. The supply tube first portion and second portion are linked with a pipe. An optical sensor is situated adjacent the pipe, and a reference reading, a first reading, and a second reading is sequentially taken with the optical sensor. The first reading and the second reading is averaged to form a fault check reading. The method further includes the step of imposing a warning signal by a controller when a magnitude of the difference between the reference reading and the fault check reading exceeds a threshold. The warning signal includes at least one item selected from the group consisting of a flashing light and an audible alarm.

According to yet another embodiment, a method for sequentially monitoring a level of a sanitation agent comprises the step of providing a supply tube having a first portion and a second portion. The method includes the step of linking the supply tube first portion and the supply tube second portion with a pipe. An optical sensor is situated adjacent the pipe, and is used to take a reference reading and a fault check reading. A controller imposes a warning signal when a difference between the reference reading and the fault check reading is greater than a threshold. The reference reading is taken when the sanitation agent is in direct contact with the pipe.

BRIEF DESCRIPTION OF THE SEVERAL VIEWS OF THE DRAWINGS

Illustrative embodiments of the present invention are described in detail below with reference to the attached drawing figures and wherein.

DETAILED DESCRIPTION

Figure 1:
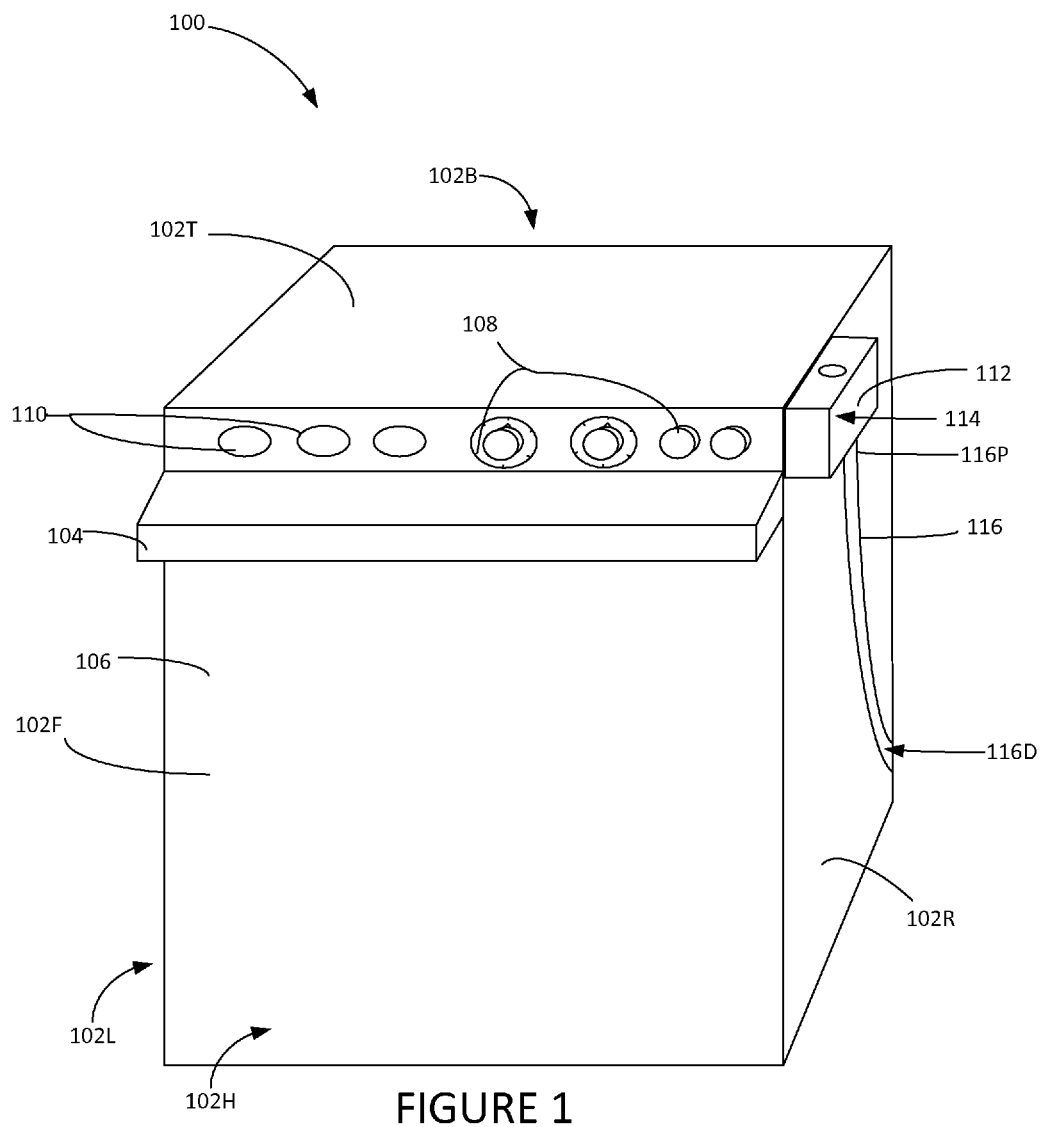
FIG. 1 is a perspective view of a PRIOR ART dishwashing system.

Embodiments of the present invention provide systems and methods for monitoring sanitation agents in dishwashing systems. Dishwashing systems provide a convenient and efficient alternative to washing dirty dishes by hand and are particularly ubiquitous in commercial settings (e.g., restaurants, bars, hotels, et cetera), where a large number of dirty dishes must be cleaned and sanitized on a regular basis.

Generally speaking, commercial dishwashers clean and sanitize dirty dishes placed therein as follows. The dirty dishes are first "prewashed", i.e., flushed with cold or warm water under moderate pressure to remove food particles. The dishes are then cleaned or washed with a cleaning compound (e.g., by soaking the dishes in the cleaning compound, by spraying the dishes with the cleaning compound, by foaming or jelling, et cetera). After the cleaning process, the dishes are rinsed with clean potable water to remove substantially all traces of the cleaning compound. Finally, the dishes are sanitized to destroy any organisms which may be present on the dishes after the cleaning and rinsing cycles.

The sanitation process is key to the effective operation of dishwashing systems, as it prevents disease, spoilage of foods, interference of microorganisms, et cetera. Commercial dishwashing systems generally utilize either high temperatures or sanitation agents to sanitize the dishes. Using high temperatures (i.e., hot water or steam) to sanitize the dishes has its advantages, as water is generally inexpensive, non-toxic and readily available. However, some organisms may remain alive on the dishes even after being subjected to hours of boiling temperatures. Furthermore, sanitation by high temperatures may be somewhat inefficient, as dishes generally have to be immersed in hot water or treated with steam for at least fifteen minutes to effectuate proper sanitation. Additionally, dishwashing systems that use high temperatures for their sanitation cycles are generally more expensive to purchase and require more energy than dishwashers utilizing sanitation agents.

Low temperature dishwashing systems (i.e., dishwashers that use sanitation agents for sanitation), hence, are becoming increasingly popular. These dishwashing systems may employ a chlorine solution as the sanitation agent, as chlorine is effective against a wide variety of microorganisms, is not affected by water hardness, is non-staining, non-film forming, and generally inexpensive. Alternatively, iodophors (i.e., loosely bound complexes of iodine and non-ionic surface active agents) and quaternary ammonium compounds may be used as sanitation agents in low temperature dishwashing systems.

Technological advancements have improved the efficiency and durability of low temperature dishwashers. Low temperature dishwashing systems have a large drawback, however: the sanitation agent may run out without anyone's knowledge, leading to the use of unsanitary dishes that look clean to the naked eye.

Many prior art alarm systems, utilizing vacuum sensors, probes, and/or impedance sensors have been developed and marketed to address this issue, though with little or no success. For example, alarm systems using vacuum sensors have proven to be unsatisfactory because they are prone to giving false alerts, and alarm systems utilizing probes have proven to be ineffective because the probes corrode quickly and require continual replacement. Similarly, alarm units using impedance sensors generally work only for a specific solution and do not allow for other types of sanitation agents and brands from being used. The present invention is directed to an alarm unit that can effectively be used with different types and brands of sanitation agents and low temperature dishwashing systems, to apprise users that the respective sanitation agent has run out and needs to be replenished or that undesirable air bubbles are present.

Attention is now directed to FIG. 1, which shows an exemplary prior art commercial dishwashing system 100. The dishwashing system 100 may have a housing 102H having a front side 102F, a right side 102R, and a top side 102T. While not clearly visible in the figures, the housing 102H of the dishwashing system 100 may also have a left side 102L opposite the right side 102R and a back side 102B opposite the front side 102F.

The housing 102H may have at the front side 102F a handle 104 secured to a door 106. The handle 104 may be used to pull the door 106 open to reveal one or more dish racks, which may be filled with dirty dishes that need to be cleaned. The dishwashing system 100 may also have one or more inputs 108 (e.g., knobs, push buttons, et cetera) for allowing users to control the various settings of the dish washing system 100, such as cycle duration, temperature, et cetera, and outputs 110 (e.g., lights, cycle alarms, et cetera) to convey information about the workings of the dishwashing system 100 to the users.

A sanitation agent supply vessel 112 (a bucket, box, et cetera) may be adhered to the dishwashing system 100 on the right side 102R of the housing 102H. The supply vessel 112 may be configured to retain a sanitation agent 114, and may dispense the sanitation agent 114 during the sanitation cycles via a supply tube 116. The supply tube 116 may be made of plastic or other desirable materials, and may have a proximal end 116P which may be coupled to (or be adjacent or otherwise associated with) the supply vessel 112 and a distal end 116D which may terminate at an inside of the housing 102H (e.g., through the back side 102B). While the sanitation agent supply vessel 112 is shown in the figures as being on the right side 102R, people of skill in the art will appreciate that the supply vessel 112 could be adhered to any location on the housing 102H of dishwashing system 100 (e.g., the top side 102T, the left side 102L, et cetera). Further, in some commercial dishwashers, the supply vessel 112 may be detached from the housing 102H, or may be internal to the housing 102H. The alarm system disclosed herein may be used with each of these (and any other) types of low temperature dishwashing systems, so long as they utilize a supply tube 116 to furnish the sanitation agent 114 from the supply vessel 112 to the dishes.

Figure 2:
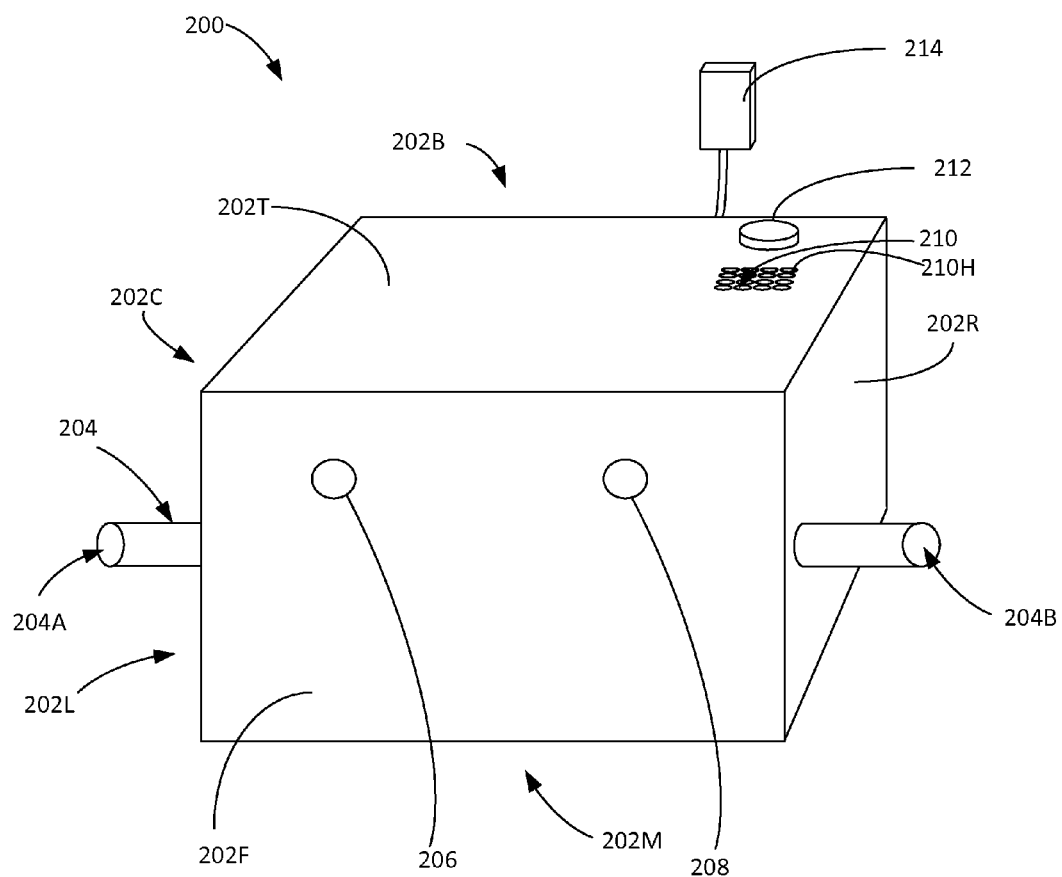
FIG. 2 is a perspective view of an alarm unit according to an embodiment of the present invention.

Attention is directed now to FIG. 2, which shows an alarm system 200 according to one embodiment of the present invention. The alarm system 200 may have a case or housing 202C comprising plastic, metal, metal alloys, or other desirable materials. The case 202C may have a top side 202T, a right side 202R, and a front side 202F. While not clearly shown in the figures, the case 202C may also have a left side 202L opposite the right side 202R, a back side 202B opposite the front side 202F, and a bottom side 202M opposite the top side 202T.

A generally hollow pipe 204 having a first end 204A and a second end 204B may extend through the case 202C such that the first and second pipe ends 204A, 204B are outside the case 202C and adjacent the case left side 202L and right side 202R, respectively. The pipe 204 may be made of clear glass or other desirable materials. People of skill in the art will appreciate that while the pipe 204 is shown in the figures as extending through the case left side 202L and the right side 202R, the pipe 204 may similarly extend through the case top side 202T and the bottom side 202B. Further, while the first and second pipe ends 204A and 204B are shown in the figures as extending past the case left side 202L and the case right side 202R, respectively, the pipe ends 204A, 204B may also be inset with respect to or be flush with the case 202C. In other embodiments still, the first end 204A of the pipe 204 may extend into the case 202C through one side (e.g., the left side 202L, the top side 202T, the right side 202R, et cetera) and the second end 204B of the pipe 204 may extend out of the case 202C through the same side; in these embodiments, the pipe 204 may extend at least partway into the case 202C.

A first output device 206 and a second output device 208 may be located on the case front side 202F. The first output device 206 and the second output device 208 may each be, for example, a light emitting diode or another kind of illuminating device, and may for example be green and red in color, respectively. People of skill in the art will appreciate that the placement, number, and color of the first and second output devices 206, 208 is exemplary only, and that the alarm system 200 may include multiple devices (e.g., lights) of varying (or the same) colors and/or other output devices (e.g., gauges, meters, electronic display screens, et cetera). The case 202C may include a third output device 210, which may be, for example, an alarm speaker. Speaker holes 210h for the speaker 210 may be provided on the case top side 202T, or at another surface of the case 202C (e.g., the case right side or left side 202R, 202L, et cetera).

The case top side 202T may also include a first input device 212, which may be, for example, a button 212 as shown or another input device (e.g., a switch, knob, biometric sensor, et cetera). The first input device 212 may be used (e.g., pressed) to silence the third output device (i.e., the alarm speaker) 210, as discussed in further detail below.

The alarm system 200 may be powered by standard AC power (e.g., at 120 volts, 240 volts, et cetera) using an AC adapter 214. Some embodiments of the alarm system 200 may be configured to be powered by a lower voltage (e.g., 12 volts, 5 volts, et cetera) to conserve energy during use, and in these embodiments, a step down transformer may be associated with the AC adapter 214 to step down the voltage from the standard voltage to the lower operating voltage. In other embodiments, the AC adapter 214 may be omitted and the system 200 may be powered by DC power instead (e.g., by using lithium ion or other batteries, which may for example be rechargeable). Embodiments of the alarm system 200 that may be powered by either AC power or DC power are also contemplated.

Figure 3:
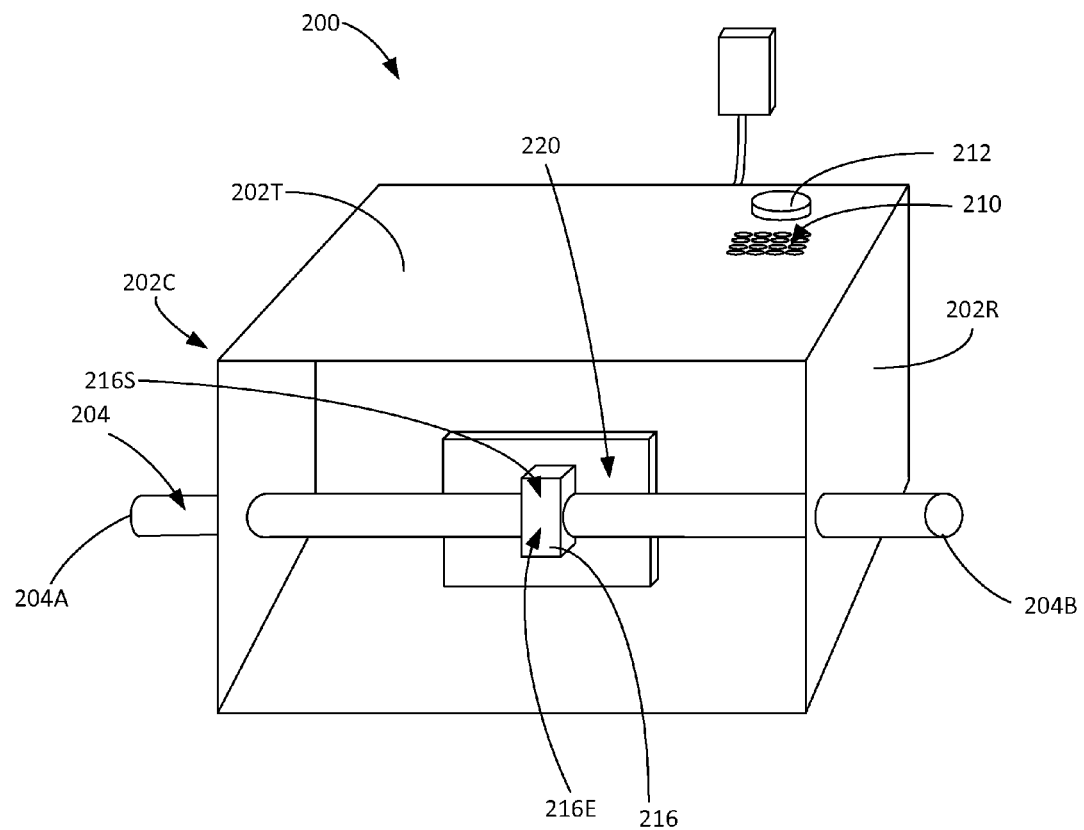
FIG. 3 is a perspective view of the alarm unit of FIG. 2 with a front side of a case removed.

Attention is now directed to FIG. 3, which shows the alarm system 200 without the case front side 202F. As can be seen, an optical sensor 216 may be enclosed within the case 202. The optical sensor 216 may comprise a photo-resistor, a photodiode, a phototransistor, et cetera. And while not clearly shown in the figures, the optical sensor 216 may include an energy emitting portion 216E and an energy sensing portion 216S. The optical sensor 216 may be programmable, and the energy sensing portion 216S may be configured to measure light energy emitted by the emitting portion 216E after the light energy is reflected off a surface.

Figure 4:
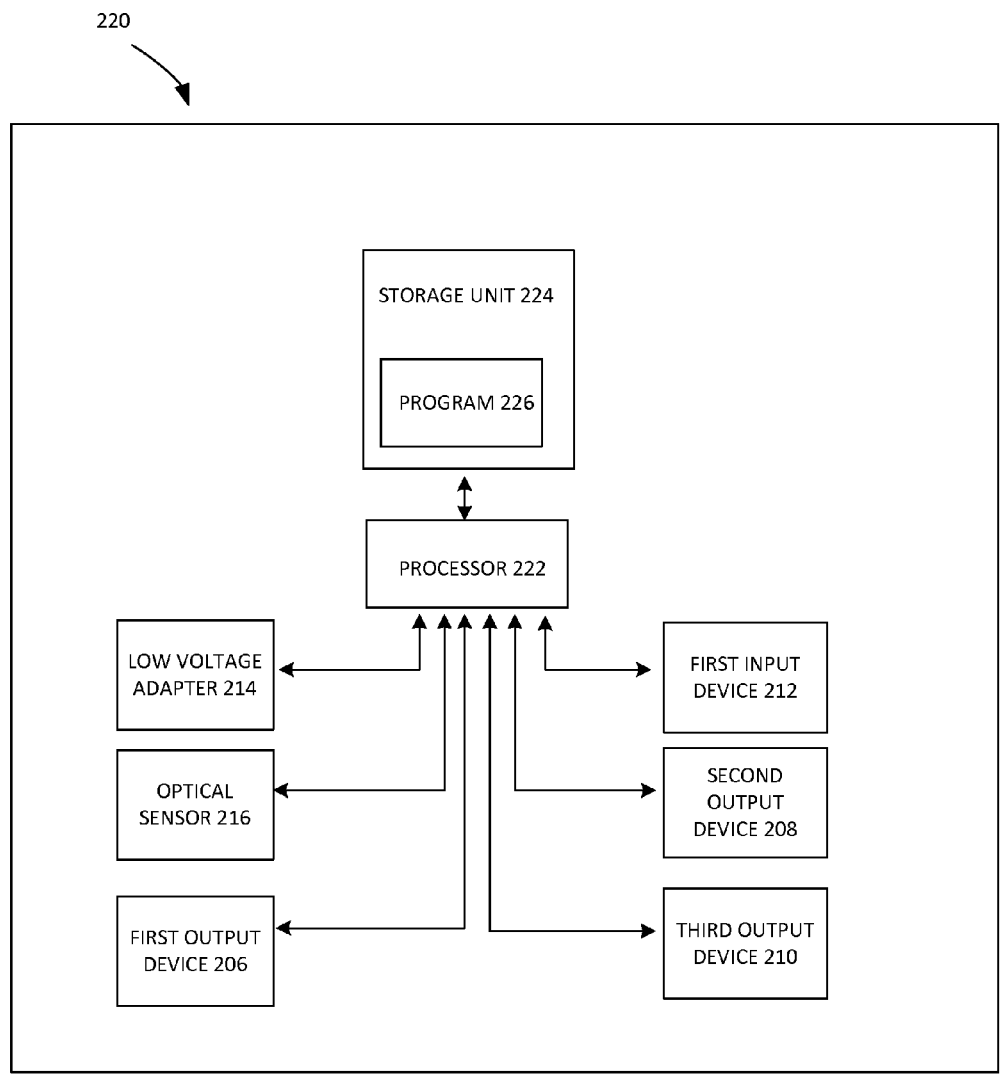
FIG. 4 is a schematic illustrating electronic communication between various components of the alarm unit of FIG. 2.

A circuit board (e.g., a single or dual layer printed circuit board) 220 may be located adjacent the optical sensor 216, or at another location within the case 202. The contents of the circuit board 220 are shown in FIG. 4. The circuit board 220 may include a processor (or controller) 222 that is in data communication with a storage unit 224 (located on a microchip on the circuit board 220, for example). The storage unit 224 may comprise volatile memory (e.g., random access memory such as DRAM, SRAM, SDRAM, FLASH, EEPROM, et cetera) and non-volatile memory (e.g., ROM, hard drive memory, et cetera), and may be configured for storage of a program 226 that embodies and causes to be executed the steps outlined herein. Each of the first output device 206, the second output device 208, the third output device 210, the first input device 212, the low voltage adapter 214 and the optical sensor 216 may be in electronic communication with the processor 222.

Figure 5A:
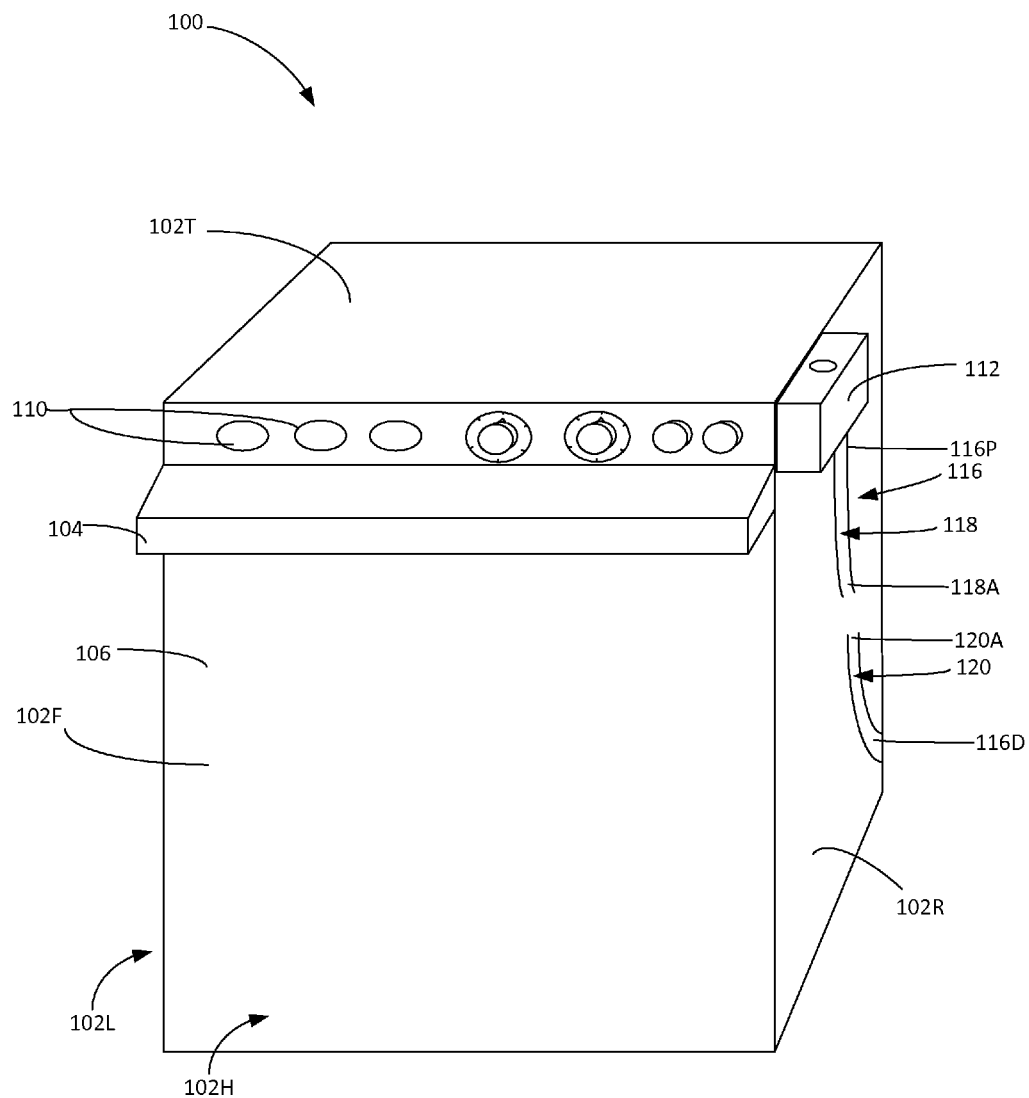
FIG. 5A is a perspective view of the dishwashing system of FIG. 1 after a portion of a tube has been cut out to allow the alarm system 200 of FIG. 2 to be operatively coupled to the dishwashing system.
Figure 5B:
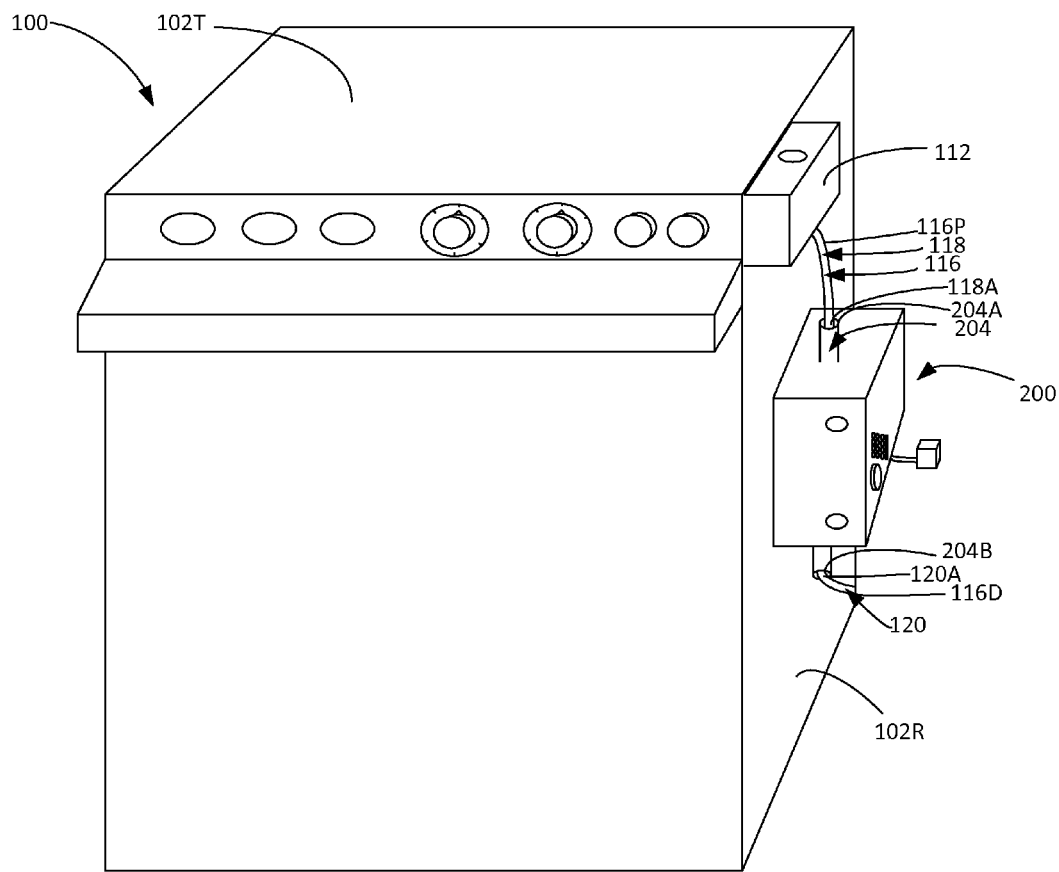
FIG. 5B is a perspective view of the alarm unit of FIG. 2 after it is operatively coupled to the dishwashing system of FIG. 5A.

FIGS. 5A-5B show the alarm system 200 being operatively coupled to the dishwashing system 100 (and specifically, the supply tube 116). To operatively couple the alarm system 200 to the dishwashing system 100, a part of the sanitation agent supply vessel tube 116 may first be cut out (or the tube 116 may simply be cut) to divide the supply tube 116 into a first portion 118 having an end 118A and a second portion 120 having an end 120A that faces the first portion end 118A (see FIG. 5A). Or, of course, two independent tubes may be provided (e.g., along with the alarm system 200) to function as portions 118, 120. Then, as shown in FIG. 5B, the supply tube first portion end 118A may be placed within (or adjacent) the hollow pipe end 204A of the alarm system 200, and the supply tube second portion end 120A may be placed within (or adjacent) the hollow pipe end 204B (see FIG. 5B). The sanitation agent 114, thus, may travel from the supply vessel 112 through the tube first portion 118 to the pipe 204, and then through the pipe 204 to the tube second portion 120 (and thereafter to the dishes, as configured by the manufacturer of the dishwashing system 100). It will be appreciated that this arrangement may not alter or impede in any significant way the workings of the dishwashing system 100, as the sanitation agent 114 simply flows through the hollow pipe 204 but does not come into contact with any other component of the alarm system 200. If desired, fittings or seals may used to ensure that the tube first and second portion ends 118A, 120A form a leak-proof pathway with the pipe 204 without substantially impeding the flow of the sanitation agent 114. Further, in some embodiments, the tube 116 may be passed through the glass pipe 204 intact (i.e., with the pipe overlaying the continuous tube 116).

Figure 6:
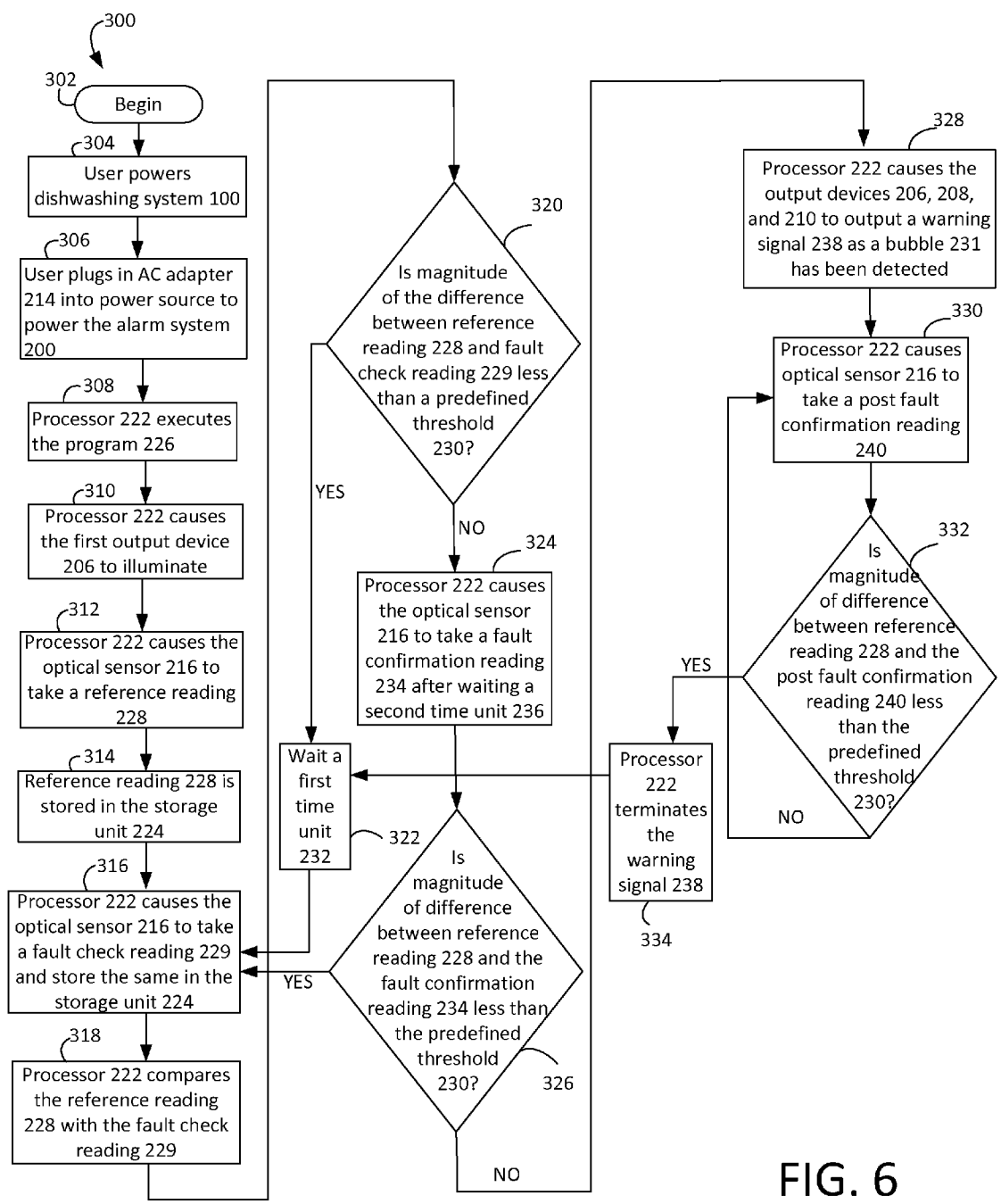
FIG. 6 is a flowchart illustrating a method performed by the alarm unit of FIG. 2.

Attention is directed now to FIG. 6, which illustrates a method 300 effectuated by the processor 222 (via, for example, execution of the program 226). The method 300 may begin at step 302, and at step 304, a user wishing to utilize the dishwashing system 100 to clean and sanitize dishes may power the dishwashing system 100. At step 306, the user may plug the AC adapter 214 into a power source to power the alarm system 200. If the alarm system 200 uses DC power (e.g., batteries), the user may plug the batteries in (or, for example, set an on/off switch to an "on" position) to power the alarm system 200. People of skill in the art will appreciate that while the alarm system 200 is being illustrated in FIG. 6 as being powered after the dishwashing system 100 is powered, that the alarm system 200 may in fact be powered at any appropriate time (e.g., before the dishwashing system 100 is powered).

Upon being powered, the processor 222 of the alarm system 200 may cause the program 226 to be executed at step 308. At step 310, the processor 222 may cause the first output device 206 to illuminate. As discussed above, the first output device 206 may be, for example, a green colored light, and may serve to apprise the user that the system 200 is powered on.

At step 312, after the sanitation agent 114 has begun to travel through the pipe 204 via the tube first portion 118, the processor 222 may cause the optical sensor 216 to take a reference reading (or measurement) 228. Specifically, the processor 222 may cause the energy emitting portion 216E of the optical sensor 216 to emit light energy and cause the energy sensing portion 216S of the optical sensor 216 to measure the same after this light energy has reflected off the sanitation agent 114 within the clear glass pipe 204. When taking the reference reading 228, the processor 222 may assume that the reserve of the sanitation agent 114 in the sanitation agent supply vessel 112 has not depleted and that the supply tube 116 and pipe 204 are supplying the sanitation agent 114 to the dishwashing system 200. In some embodiments, the program 226 may incorporate a waiting time (i.e., wait for a certain time period after the alarm system 200 is plugged in before taking the reference reading 228) to ensure that the reference reading 228 is being taken during the sanitation cycle of the dishwashing system 100. The processor 222 may then cause the reference reading 228 to be stored in the storage unit 224 at step 314.

At step 316, the processor 222 may cause the optical sensor 216 to take a "fault check" reading 229 and store the fault check reading 229 in the storage unit 224. At step 318, the processor 222 may compare the reference reading 228 with the fault check reading 229. Specifically, the processor 228 may ascertain the magnitude of the difference between the reference reading 228 and the fault check reading 229. At step 320, the processor 222 may check whether this magnitude of the difference between the reference reading 228 and the fault check reading 229 is less than a predefined threshold 230. If the magnitude of the difference between the reference reading 228 and the fault check reading 229 is less than the predefined threshold 230, the processor 222 may assume that the pipe 204 continues to have the sanitation agent 114 in it and infer therefrom that the sanitation agent supply vessel 112 is not empty. That is, where the magnitude of the difference between the reference reading 228 and the fault check reading 229 is less than the predefined threshold 230, the processor 222 may determine that both the reference and the fault check readings 228, 229 incorporate light energy reflected off the sanitation agent 114 within the pipe 204. The processor 222 may then wait a first time unit 232, which may be for example, a tenth of a second, a second, a minute, et cetera, and return to step 316 to take a new fault check reading 229 for comparison with the reference reading 228.

If, however, the processor 222 determines at step 320 that the magnitude of the difference between the reference reading 228 and the fault check reading 229 is greater than (and in some embodiments, equal to) the predefined threshold 230, the processor 222 may assume that the fault check reading 229 incorporates light energy that has reflected off an air bubble 231 within the pipe 214, which in turn has caused the magnitude of the difference between the two readings to exceed the threshold 230. The air bubble 231 in the pipe 114 may indicate that the supply vessel 112 has (or is about to) run out of the sanitation agent 114. Alternatively, the air bubble 231 may have simply been a byproduct of the flow of the sanitation agent 114 within the pipe 214 in line with the commands of the dishwashing system 100.

It has been found that the air bubble 231 formed upon depletion of the sanitation agent 114 will generally be longer than the air bubble 231 formed within the pipe 214 during normal operation (i.e., where the sanitation agent supply vessel 112 is not depleted). Therefore, to ensure that the air bubble 231 was created because of the depletion of the sanitation agent 114, the processor 222 may wait a second time unit 236 (e.g., a microsecond, a milli-second, et cetera) before taking a fault confirmation reading 234 with the optical sensor 216 at step 324. If the magnitude of the difference between the reference reading 228 and the fault confirmation reading 234 is less than the predefined threshold, the processor 222 may assume that the fault check reading 229 incorporated light energy reflected off the air bubble 231 that was formed during normal operation of the dishwashing system 100 and return to step 316 to take additional fault check readings 229. If, on the other hand, the processor determines at step 326 that the magnitude of the difference between the reference reading 228 and the fault check reading 229 continues to exceed the threshold 230, the processor 222 may assume that the air bubble 231 was formed upon depletion of the sanitation agent 114. The processor 222 may therefore output a warning signal 238 at step 328.

The warning signal 238 may be of various types. In one embodiment, the warning signal 238 may comprise the flashing of both the first and second output devices 206, 208 (i.e., the green and red lights), and the sounding of an alarm via the third output device 210 (i.e., the alarm speaker 210). Where the alarm system 200 is being used in a setting where the sound from the speaker 210 is undesirable, the warning signal 238 may include only the flashing of the first and second output devices 206, 208. Further, the user may utilize the first input device 212 (e.g., a button) to silence the audible alarm. In some embodiments, the user may use the first input device 212 to silence the audible alarm only for a period of time (e.g., three minutes, five minutes, et cetera) to allow the user to refill the sanitation agent supply vessel 112.

The processor 222 may then at step 330 take a post-fault confirmation reading 240, and compare the post-fault confirmation reading 240 with the reference reading 228 at step 332. If the magnitude of the difference between the post-fault confirmation reading 240 and the reference reading 228 is less than the predefined threshold 230, the processor 222 may assume that the sanitation agent 114 in the sanitation agent supply vessel 112 has been replenished and terminate the warning signal 238 at step 334. The program 116 may then loop back to step 322, where it may wait the first time unit 232 and then take another fault check reading 229 at step 316. If, on the other hand, the magnitude of the difference between the post-fault confirmation reading 240 and the reference reading 228 is greater than the predefined threshold 230, the program 226 may assume that the supply vessel 112 continues to have an insufficient quantity of the sanitation agent 114 and return to step 330 to take another post-fault confirmation reading 240. The program 226 may continue in this fashion, and end when the user powers down the system 200 (e.g., by disconnecting the adapter 214).

Thus, as has been described, the alarm system 200 may utilize the optical sensor 216 to determine if an air bubble 231 has been formed within the pipe 204, distinguish between relatively insignificant air bubbles 231 that are formed during normal operation of the dishwashing system 100 and larger air bubbles 231 that are formed upon depletion of the sanitation agent 114, and warn the user when the sanitation agent 114 needs to be replenished without interfering with the workings of the dishwashing system 100. Further, because the reference reading 228 (and the remaining readings such as the fault check reading 234, the fault confirmation reading 234, et cetera) are taken anew each time the alarm system 200 is powered on, users may use the alarm system 200 to monitor different types of sanitation agents.

Advantageously, various types of existing low temperature dishwashing systems may be easily and conveniently retrofitted to incorporate the alarm system 200. Of course, the alarm system 200 may also be provided as part of new dishwashing systems. Various types of fasteners (e.g., hooks, Velcro®, nuts and bolts, et cetera) may be used to situate the alarm system 200 at a desirable location (e.g., above or behind the dishwashing system 100, on a surface of a dishwashing machine control box, et cetera).

In some embodiments, instead of successively comparing each of the fault check reading 229 and the fault confirmation reading 234 with the reference reading 228 in the method 300, the processor 222 may first compare the fault check reading 229 with the reference reading 228 to ensure that the magnitude of their difference is less than the threshold 230, and then compare the fault check reading 229 with the fault confirmation reading 234 (instead of comparing the fault confirmation reading 234 with the reference reading 228). In these embodiments, the warning signal 238 may be outputted if a magnitude of a difference between the fault check reading 239 and the fault confirmation reading 234 exceeds a second threshold 230A (which may be of a different numerical value than the threshold 230). People of skill in the art will appreciate that a difference between the magnitudes of the fault check reading 239 and the fault confirmation reading 234 in excess of the second threshold 230A may indicate that the fault confirmation reading 234 incorporates light energy that has reflected off the air bubble 231, which may in turn indicate that the supply vessel 112 needs to be replenished with the sanitation agent 114.

In other embodiments still, the fault check reading 229 may be representative of several readings taken with the optical sensor 216. For example, in some embodiments, instead of comparing the reference reading 228 with an isolated fault check reading 229 at steps 318 and 320, and then with an isolated fault confirmation reading 234 at steps 324 and 326, the program 226 may instead first cause several sequential fault check readings 229 to be taken and averaged, and then compare this averaged fault check reading 229 with the reference reading at steps 318 and 320. The average value of the various fault check reading 229 may be determined using any appropriate technique, such as a root mean square, a weighted mean, et cetera. In these embodiments, the subsequent comparison between the fault confirmation reading 234 and the threshold reading 228 may be omitted. The program 226 may also compute other information about the readings, such as the variance of the sequential fault check readings 229, and store this information in the storage unit 224.

Figure 7:
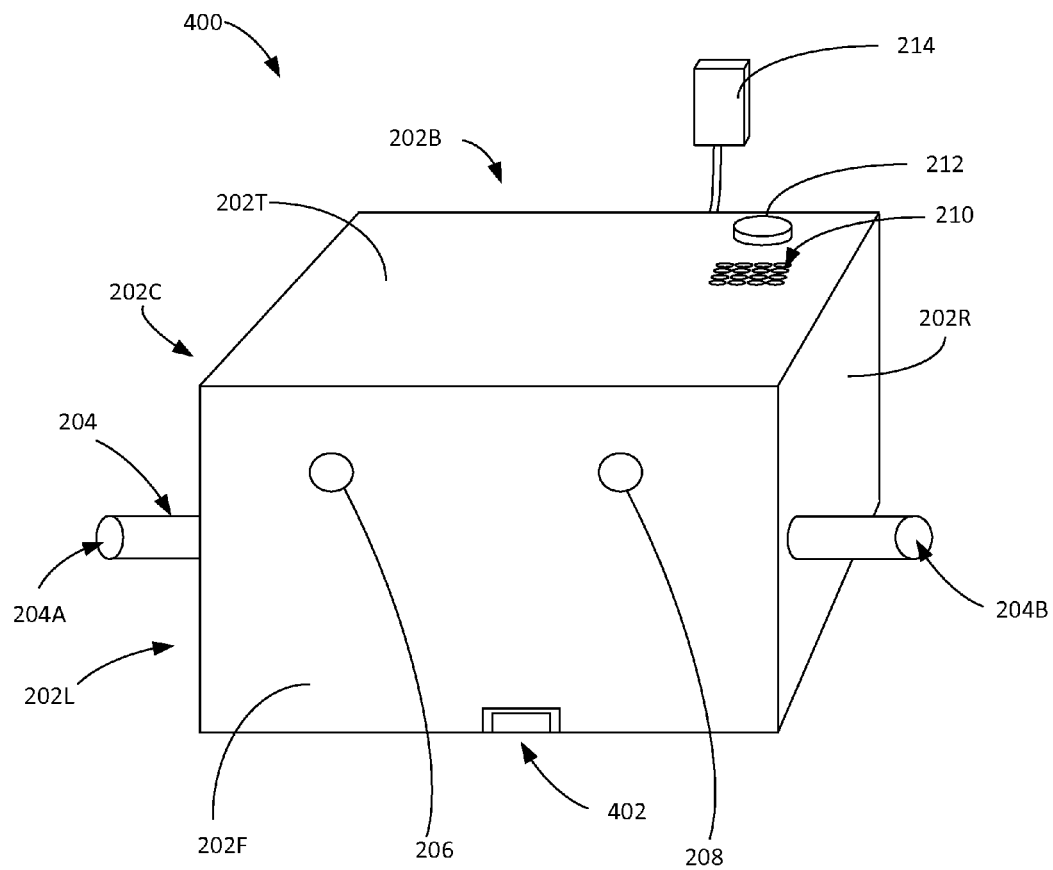
FIG. 7 is a perspective view of an alternate embodiment of the alarm unit of FIG. 2.

Attention is directed now to FIG. 7, which shows an alternate embodiment 400 of the alarm system 200. For uniformity and brevity, corresponding numbers may be used to indicate corresponding parts, though with any noted deviations. Further, people of skill in the art will appreciate that the alarm system 200 (and hence the alarm system 400) may be modified in various ways, such as by incorporating all or part of the disclosures herein.

Figure 8:
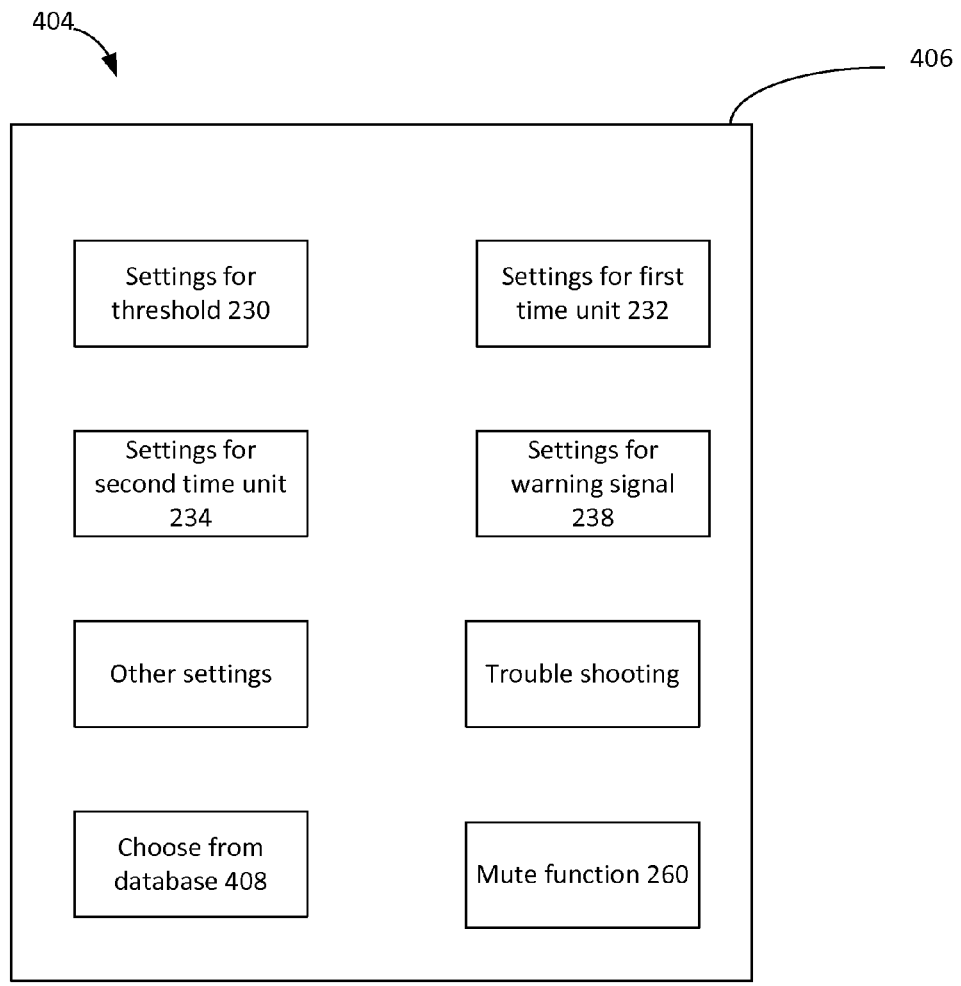
FIG. 8 is a schematic illustrating a software for use with the alarm unit of FIG. 7.

One of the main differences between the alarm system 200 and the alarm system 400 is that the alarm system 400 may include a connection means 402 (e.g., a USB port, an SD or other card reader, a wired or wireless networking port such as a WIFI port a Bluetooth port, et cetera) for allowing the user to change the various settings of the alarm system 400. The connection means 402 may be in data communication with the processor 222. The user may electronically couple the alarm system 400 with a computer or other device using the connection means 402, and then use a software 404 to make changes to the settings of the alarm 400. FIG. 8 shows an exemplary interface 406 of the software 404. As can be seen, the user may use this interface 406 for trouble shooting, to adjust the numerical values of the threshold 230, the first time unit 232 and the second time unit 236, to configure the warning signal 238 (e.g., change the volume of the audible alarm or the frequency of the flashing lights), et cetera, based on the type of sanitation agent 114 being employed and other relevant considerations (e.g., dishwasher type and/or manufacturer, and location of the dishwashing system 100). The software 404 may also include a database 408 that includes optimal settings for use with particular sanitation agents 114 and/or dishwashing systems 100. In some embodiments, the user may be allowed to store in the storage unit 224 multiple settings configured for use with varying dishwashing systems 100; the user may then apply one of the multiple settings (by pushing a button, for example) depending on the sanitation agent 114 being used, the type and brand of the dishwashing system 100, the location of the dishwashing system 100, et cetera. In some embodiments, the interface 406 may include a mute function 260. Like the first input device 212, a user may use the mute function 260 to, for example, silence the third output device 210, which may desirably allow a user to silence the alarm 210 remotely. In some embodiments, the mute function 260 may also allow a user to cancel the audible alarm 210, or to set a duration for which the alarm 210 is to be muted (e.g., about five minutes). The alarm system 400 may thus provide the user with increased flexibility.

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention.

It will be understood that certain features and subcombinations are of utility and may be employed without reference to other features and subcombinations and are contemplated within the scope of the claims. Not all steps listed in the various figures need be carried out in the specific order described.

The invention claimed is:

1. An alarm system for monitoring a level of a sanitation agent in a dishwasher, the dishwasher having a sanitation agent supply vessel associated with a supply tube, the supply tube having a first portion adjacent the supply vessel and a second portion, the alarm system comprising:
    a hollow pipe configured for receiving the sanitation agent from the supply tube first portion and conveying the sanitation agent to the supply tube second portion;
    an optical sensor configured for sequentially taking a reference reading, a first reading, and a second reading; the first and the second readings being averaged to compute a fault check reading;
    a first output device; and
    a controller in electronic communication with the optical sensor and the first output device;
    wherein the controller causes the first output device to output a warning signal upon detecting an air bubble in the pipe when a magnitude of the difference between the reference reading and the fault check reading exceeds a threshold.

2. The alarm system of claim 1, wherein the hollow pipe comprises clear glass.

3. The alarm system of claim 2 further comprising a second output device and a third output device; and wherein:
    the first output device is an illuminating device of a first color;
    the second output device is an illuminating device of a second color, the second color being different from the first color;
    the third output device is a speaker.

4. The alarm system of claim 3 wherein the controller causes the optical sensor to take a post-fault confirmation reading after the imposition of the warning signal.

5. The alarm system of claim 4 wherein the controller terminates the warning signal if a magnitude of a difference between the reference reading and the post-fault confirmation reading is less than the threshold.

6. The alarm system of claim 5 further comprising a first input device.

7. The alarm system of claim 6 wherein the first input device is a mute button configured to silence the third output device after the imposition of the warning signal.

8. The alarm system of claim 7 wherein the mute button silences the third output device for about five minutes.

9. The alarm system of claim 1, further comprising a step down voltage transformer.

10. A method for monitoring a level of a sanitation agent in a dishwashing system having a sanitation agent supply vessel, the method comprising steps:
    providing a supply tube having a first portion and a second portion, the first and second portions being unconnected to one another;
    linking the supply tube first portion and the supply tube second portion with a pipe;
    situating an optical sensor adjacent the pipe;
    sequentially taking a reference reading, a first reading, and a second reading with the optical sensor;
    computing a fault check reading, the fault check reading being an average of the first reading and the second reading;
    and
    imposing by a controller a warning signal when a magnitude of the difference between the reference reading and the fault check reading exceeds a threshold;
    wherein the warning signal comprises at least one item selected from the group consisting of a flashing light and an audible alarm.

11. The method of claim 10 further comprising the step of taking a post-fault confirmation reading after the warning signal is imposed.

12. The method of claim 11, wherein the reference reading is taken when the sanitation agent is in direct contact with the pipe.

13. The method of claim 12 wherein the pipe comprises clear glass.

14. The method of claim 13 wherein:
the supply tube is associated with the supply vessel by a manufacturer of the dishwashing system; and
the supply tube is cut to divide the supply tube into a first portion and a second portion.

15. A method for sequentially monitoring a level of a sanitation agent, the method comprising steps:
providing a supply tube having a first portion and a second portion;
linking the supply tube first portion and the supply tube second portion with a pipe;
situating an optical sensor adjacent the pipe;
using the optical sensor to take a reference reading and a fault check reading;
imposing by a controller a warning signal when a difference between the reference reading and the fault check reading is greater than a threshold;
wherein the reference reading is taken when the sanitation agent is in direct contact with the pipe.

16. The method of claim 15 further comprising the step of providing a housing to house the optical sensor; the pipe extending at least partway into the housing.

17. The method of claim 16 wherein the reference reading is taken after a waiting time has elapsed.

18. The method of claim 16 further comprising the step of incorporating with the housing a networking port.

19. The method of claim 18 wherein the pipe comprises clear glass.

20. The method of claim 19 wherein the warning signal comprises a flashing light and an audible alarm.

* * * * *